US011613239B2

(12) United States Patent
Schlangen et al.

(10) Patent No.: US 11,613,239 B2
(45) Date of Patent: Mar. 28, 2023

(54) PRESSURE SUPPLY UNIT FOR A BRAKE SYSTEM OF A VEHICLE

(71) Applicant: BWI (Shanghai) Co., Ltd., Shanghai (CN)

(72) Inventors: Trevor Matthew Schlangen, Moraine, OH (US); Eric Michael Higgins, Dayton, OH (US); David Fredrick Reuter, Beavercreek, OH (US); Brian Marc D'Amico, Moraine, OH (US); Frank Gerard Pirrello, Dayton, OH (US); Anthony Vincent Pesarek, Dayton, OH (US)

(73) Assignee: BWI (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/346,240

(22) Filed: Jun. 12, 2021

(65) Prior Publication Data

US 2022/0396255 A1    Dec. 15, 2022

(51) Int. Cl.
*F16H 25/22*    (2006.01)
*B60T 17/08*    (2006.01)
(Continued)

(52) U.S. Cl.
CPC ............ *B60T 17/08* (2013.01); *B60T 13/745* (2013.01); *F15B 15/20* (2013.01);
(Continued)

(58) Field of Classification Search
CPC . H02K 7/06; H02K 11/21; G01D 5/24; G01B 7/30; F16H 25/2204;
(Continued)

(56) References Cited

U.S. PATENT DOCUMENTS 5,682,965 A    11/1997 Prinzler
5,836,659 A  * 11/1998 Feigel .................. B60T 8/4266
                                                        303/DIG. 11
(Continued)

FOREIGN PATENT DOCUMENTS

CN    104442783 A    3/2015
CN    105393017 A    3/2016
CN    107435696 A    12/2017
(Continued)

OTHER PUBLICATIONS

Extended European Search Report dated Nov. 17, 2022 for counterpart European patent application No. 22178362.4.
(Continued)

*Primary Examiner* — William C Joyce
*Assistant Examiner* — Gregory Robert Weber
(74) *Attorney, Agent, or Firm* — William H. Honaker; Dickinson Wright PLLC

(57) ABSTRACT

A pressure supply unit for a brake system including a booster body that defines an axially extending cylinder. A piston is slideable within the cylinder. The piston defines a bore that receives a spindle. The spindle is rotationally fixed and axially moveable for providing the axial movement of the piston. A motor is positioned about the spindle and is configured to axially translate the spindle and piston. A ball and socket joint connects the piston and spindle while accommodating pivoting movement of the spindle. The ball and socket joint includes a ball at a front end of the spindle and a socket in the bore of the piston which receives the ball.

14 Claims, 17 Drawing Sheets

(51) Int. Cl.
*B60T 13/74* (2006.01)
*F15B 15/20* (2006.01)
*H02K 7/06* (2006.01)
*H02K 7/116* (2006.01)
*F16C 11/06* (2006.01)
*G01B 7/30* (2006.01)
*G01D 5/24* (2006.01)
*H02K 11/21* (2016.01)
*F16H 25/20* (2006.01)
*F16H 1/06* (2006.01)

(52) U.S. Cl.
CPC ...... *F16C 11/0604* (2013.01); *F16H 25/2204* (2013.01); *G01B 7/30* (2013.01); *G01D 5/24* (2013.01); *H02K 7/06* (2013.01); *H02K 7/116* (2013.01); *H02K 11/21* (2016.01); *B60T 2270/82* (2013.01); *F16H 1/06* (2013.01); *F16H 2025/2081* (2013.01)

(58) Field of Classification Search
CPC ..... F16H 2025/2078; F16H 2025/2436; B60T 13/745; B60T 8/4018; B60T 17/4022; B60T 17/08; F16C 11/0604
See application file for complete search history.

(56) References Cited

U.S. PATENT DOCUMENTS

| | | | |
|---|---|---|---|
| 6,453,761 B1* | 9/2002 | Babinski | H02K 7/06 310/80 |
| 9,586,487 B2 | 3/2017 | Knechtges | |
| 10,001,163 B1* | 6/2018 | Elterman | F16C 11/0685 |
| 10,393,199 B2* | 8/2019 | Tandler | H02K 7/06 |
| 10,549,737 B2* | 2/2020 | Leiber | B60T 13/145 |
| 10,703,350 B2 | 7/2020 | Knechtges et al. | |
| 10,814,851 B2 | 10/2020 | Geider | |
| 10,859,143 B2* | 12/2020 | Chung | F16H 25/20 |
| 10,919,508 B2* | 2/2021 | Reuter | B60T 11/22 |
| 11,273,813 B2* | 3/2022 | Gaffe | B60T 11/18 |
| 11,285,931 B2* | 3/2022 | Lee | B60T 13/745 |
| 2002/0116924 A1 | 8/2002 | Winkelmann et al. | |
| 2010/0242469 A1 | 9/2010 | Jungbecker et al. | |
| 2010/0247232 A1* | 9/2010 | Lin | F16D 1/108 403/76 |
| 2017/0152926 A1* | 6/2017 | Ikeda | F16H 25/2015 |
| 2018/0170328 A1 | 6/2018 | Yoshizu et al. | |
| 2020/0269825 A1 | 8/2020 | Stauder et al. | |

FOREIGN PATENT DOCUMENTS

| | | |
|---|---|---|
| CN | 109572655 A | 4/2019 |
| CN | 110077374 A | 8/2019 |
| CN | 110667551 A | 1/2020 |
| CN | 111095748 A | 5/2020 |
| CN | 210661128 U | 6/2020 |
| DE | 19823568 A1 | 5/1999 |
| DE | 102017113725 A1 | 12/2018 |
| JP | 2015065768 A | 4/2015 |
| JP | 6344721 B2 | 6/2018 |
| WO | 2009146737 A1 | 12/2009 |
| WO | 2019003944 A1 | 1/2019 |
| WO | 2020038759 A1 | 2/2020 |

OTHER PUBLICATIONS

First Office Action and search report dated Jan. 11, 2023 for counterpart Chinese patent application No. 202210634158.9 with machine EN translation.

* cited by examiner

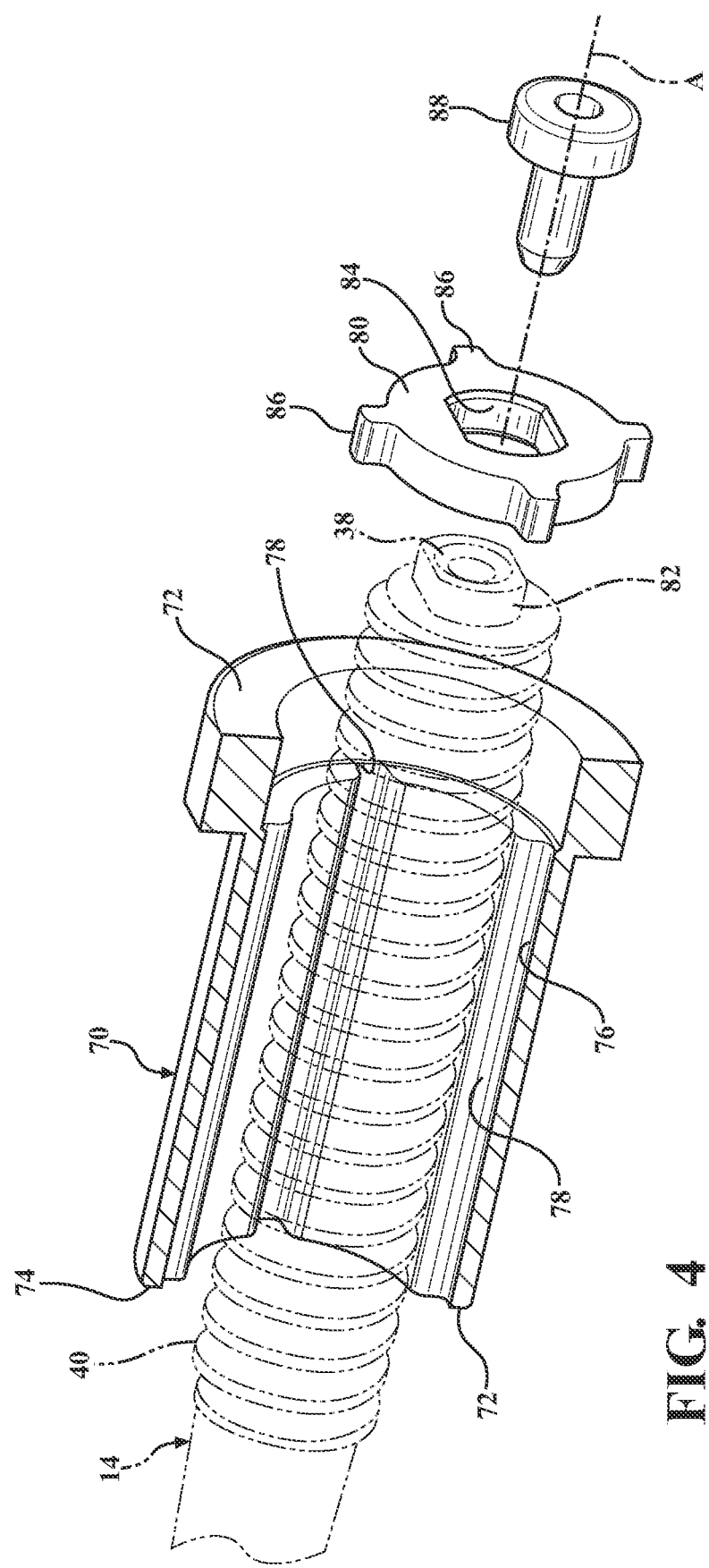

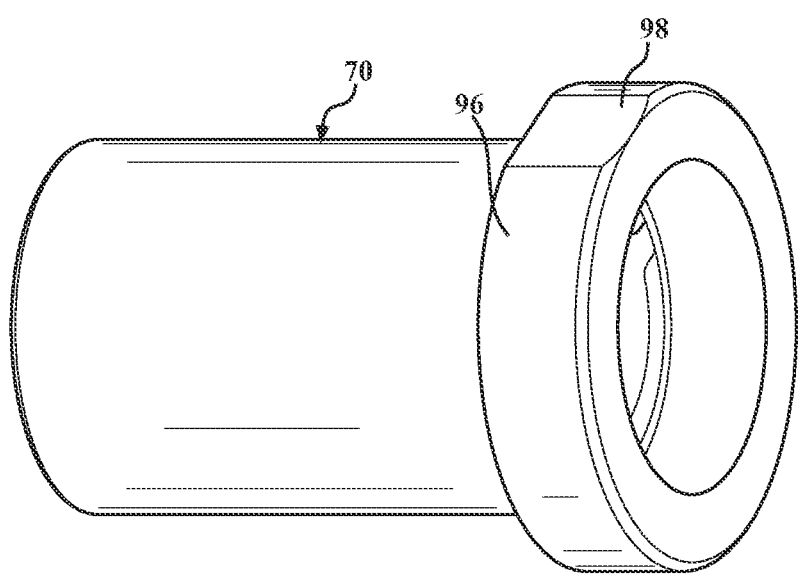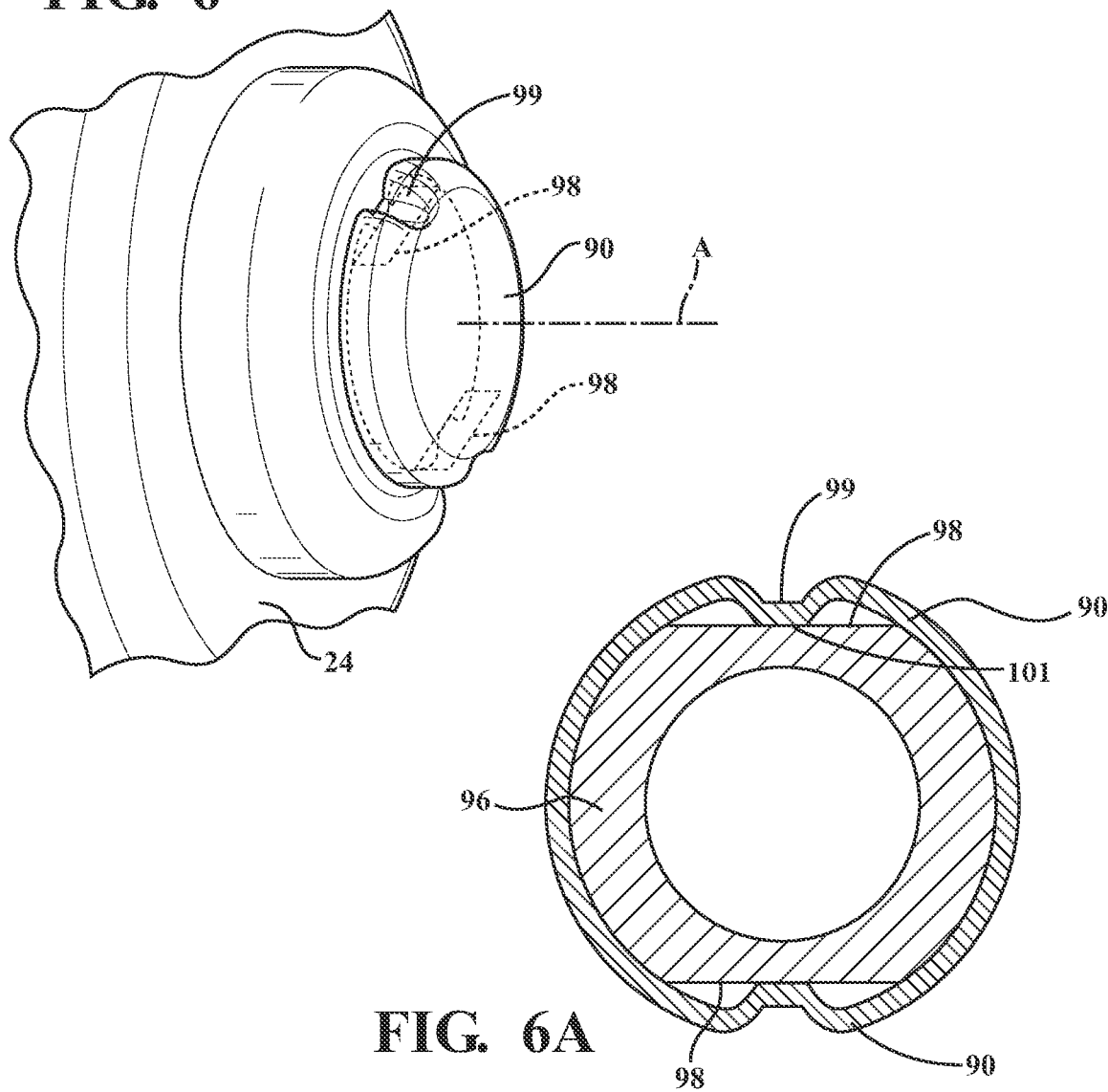

PRESSURE SUPPLY UNIT FOR A BRAKE SYSTEM OF A VEHICLE

TECHNICAL FIELD

A pressure supply unit for a brake system of a vehicle such as an automobile.

BACKGROUND

Pressure supply units are used in conjunction with electro-hydraulic brake-by-wire systems for vehicles such as automobiles to provide brake pressure in place of a traditional booster, master cylinder and brake pedal arrangement. Pressure supply units are commanded by an Electronic Control Unit (ECU) which derives signals from a driver via sensors in a pedal feel emulator and/or from an auto pilot that can self-apply the brakes without driver intervention. Pressure supply units typically include a motor comprised of a stator and a rotatable rotor container within the stator, with the rotor housing a high efficiency screw assembly which is furthermore attached to a piston contained in a cylinder of a booster body. Rotation of the rotor effectuates translating movement of the spindle and piston, thereby causing the brake pressure change for effectuating the brakes.

There remains a continued need for improvements to such pressure supply units.

SUMMARY

According to an aspect of the disclosure, a pressure supply unit is provided for a brake system. The pressure supply unit includes a booster body that defines a cylinder that extends along an axis. A piston is axially slideable within the cylinder. The piston defines a bore along the axis. A spindle extends along the axis and is received by the bore of the piston. The spindle is rotationally fixed and axially moveable for providing the axial movement of the piston. A motor is positioned about the spindle and is configured to axially translate the spindle for providing the axial movement of the piston. A ball and socket joint couples the piston and spindle while accommodating pivoting movement of the spindle relative to the piston. The ball and socket joint includes a ball at a front end of the spindle and a socket in the bore of the piston which receives the ball.

The ball and socket joint provides a simple manner of accommodate pivoting movement of the spindle relative to the piston, thus providing reduced wear of the spindle and piston.

According to another aspect of the disclosure, a pressure supply unit is provided for a brake system. The pressure supply unit includes a booster body that defines a cylinder extending along an axis. A piston is axially slideable within the cylinder. The piston defines a bore along the axis. A spindle extends along the axis and is received by the bore of the piston. The spindle is rotationally fixed and axially moveable for providing the axial movement of the piston. A motor is positioned about the spindle and configured to axially translate the spindle for providing the axial movement of the piston. The motor includes an annular stator and an annular rotor rotatable within the stator in response to a current passing into the stator. At least one gear is rotatable in response to rotation of the rotor and is configured to rotate a magnet. A sensor is provided for detecting rotation of the magnet to determine a rotor angle of the rotor.

The arrangement of the at least one gear and sensor provide a simple, compact and reliable method for detecting a rotor angle of the rotor.

According to another aspect of the disclosure, a pressure supply unit is provided for a brake system. The pressure supply unit includes a booster body that defines a cylinder extending along an axis. A motor cover is coupled to the booster body and defines a compartment. A piston is axially slideable within the cylinder. The piston defines a bore along the axis. A spindle extends along the axis and is received by the bore of the piston. The spindle is rotationally fixed and axially moveable for providing the axial movement of the piston. A motor is positioned about the spindle in the compartment of the motor cover and configured to axially translate the spindle for providing the axial movement of the piston. The motor includes an annular stator and an annular rotor rotatable within the stator in response to a current passing into the stator. An anti-rotation sleeve is disposed about the spindle and fixed to the motor cover. The anti-rotation sleeve is configured to inhibit rotation of the spindle while permitting axial movement of the spindle. The motor cover presents an axially extending annular protrusion defining a pocket inside the compartment inside the motor cover. The anti-rotation sleeve is fixed to the motor cover inside the pocket.

The arrangement of the anti-rotation sleeve is fixed to the pocket of the motor cover provides a compact and simple arrangement for preventing rotation of the spindle. This arrangement further allows the motor cover to be constructed without a separate end cap on the motor housing.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 4 is an exploded, cutaway, perspective view of an anti-rotation sleeve of the pressure supply unit, illustrating its connection to a spindle;

FIG. 5 is a perspective view of the anti-rotation sleeve, illustrating a planar surface for fixing the anti-rotation sleeve to a motor cover;

FIG. 6 is a perspective view of a protrusion of a motor cover, illustrating the protrusion receiving and fixed to the anti-rotation sleeve;

FIG. 6A is a front cross-sectional view of a pair of staked portions of the motor cover engaging planar surfaces of the anti-rotation sleeve;

DESCRIPTION OF THE ENABLING EMBODIMENT

Figure 1:
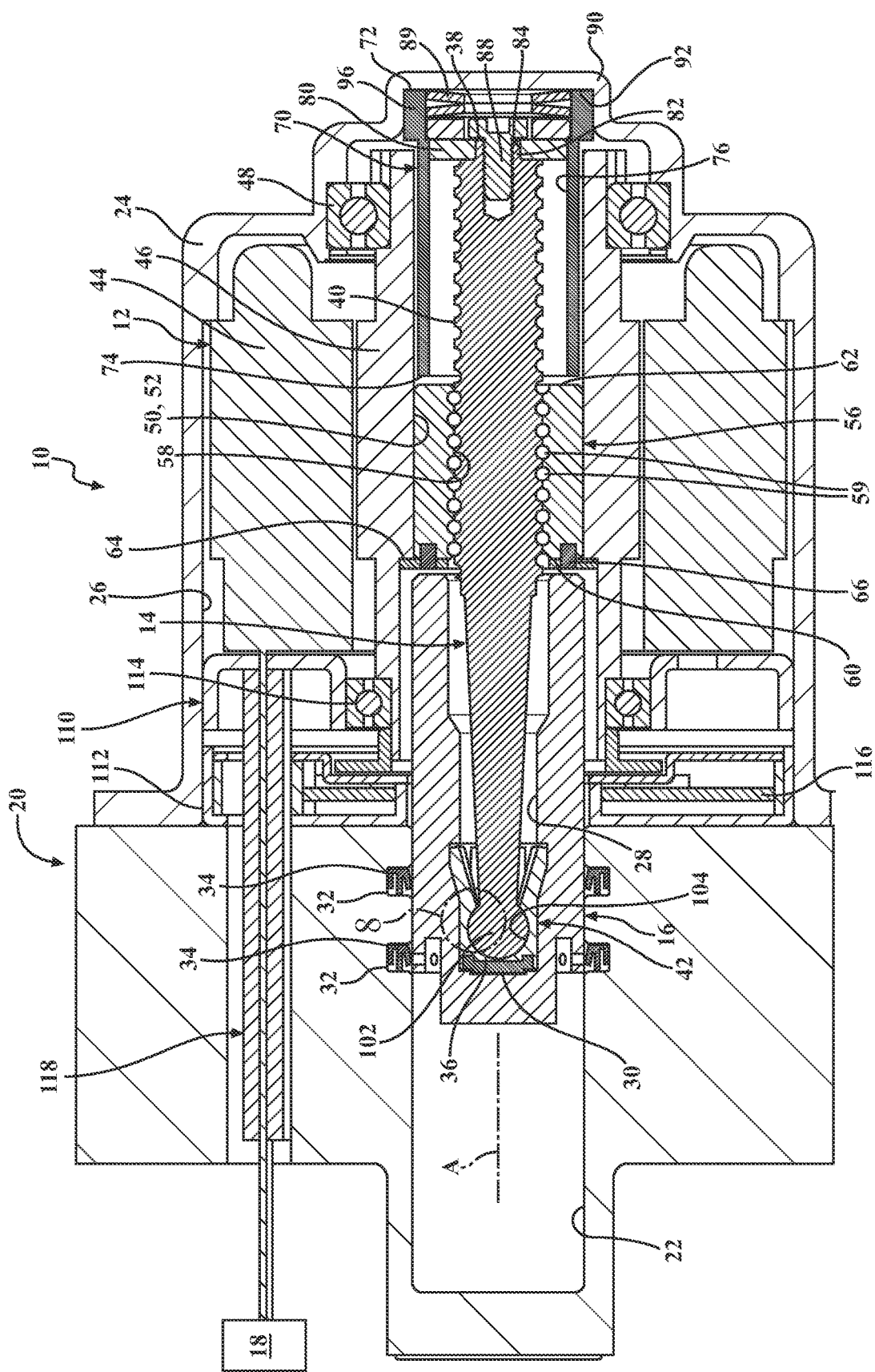
FIG. 1 is a cross-sectional side view of an example embodiment of a pressure supply unit.
Figure 2:
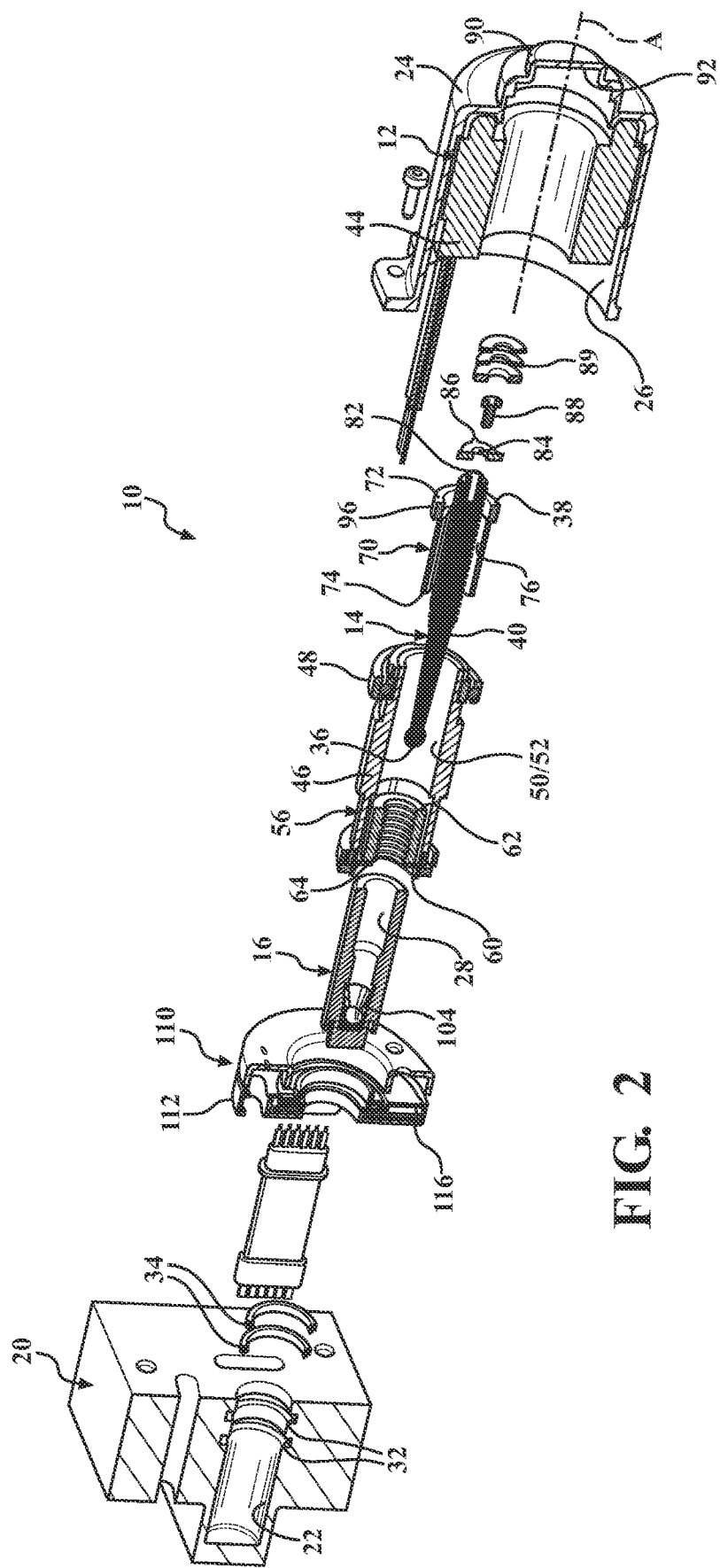
FIG. 2 is an exploded, perspective view of pressure supply unit.

Referring to the figures, wherein like numerals indicate corresponding parts throughout the several views, a pressure supply unit 10 is generally shown for a brake system of an automobile. More particularly, as best shown in FIGS. 1 and 2, the subject pressure supply unit 10 is used in conjunction with an electro-hydraulic brake-by-wire system where a motor 12, spindle 14, and piston 16 provide brake pressure in place of a traditional booster, master cylinder and brake pedal arrangement. The pressure supply unit 10 is commanded by an Electronic Control Unit (ECU) 18 (schematically shown) with derived signals from a traveler and/or force sensor in a pedal feel emulator and/or from an auto pilot which can initiate braking independent of a driver. The pedal fee emulator provides brake pedal feel and feedback to a driver while a manual backup system is isolated from wheel brake circuits.

In more detail, the pressure supply unit 10 includes a booster body 20 that defines a cylinder 22 that extends along an axis. A motor cover 24 axially engages the booster body 20 and defines a compartment 26. The piston 16 is axially received by the cylinder 22 and axially slideable within the cylinder 22 and the compartment 26 of the motor cover 24 for creating a brake pressure in the cylinder 22 in response to the sliding movement of the piston 16. The piston 16 defines a bore 28 along the axis A, with the bore 28 terminating axially at an end 30. The booster body 20 further includes a pair of recesses 32 that extend radially outwardly into the booster body 20 from the cylinder 22, and extend annularly about the axis A. Each of the recesses 32 receives one of a pair of seals 34 that are configured to prevent the passage of fluid between the booster body 20 and piston 16 in the cylinder 22.

The spindle 14 extends axially between a front end 36 received in the bore 28 of the piston 16, and a rear end 38 located axially outside of the bore 28 in the compartment 26 of the motor cover 24. The spindle 14 presents a threaded outer surface 40. A ball and socket joint 42 (discussed in further detail below) connects the spindle 14 to the piston 16 in the bore 28.

The motor 12 is positioned about the spindle 14 in the compartment 26 of the motor cover 24. The motor 12 is configured to axially translate the spindle 14 for providing the axial movement of the piston 16. More particularly, the motor 12 includes an annular stator 44 and an annular rotor 46, each positioned about the axis A. The annular rotor 46 has a magnetic outer surface and is rotatable within the stator 44 about the axis A in response to a current being applied to the stator 44. One or more bearings 48 are positioned radially between the rotor 46 and the motor cover 24 for accommodating rotation of the rotor 46 relative to the booster body 20. As schematically shown, the motor 12 is connected to the ECU 18 to provide desired actuation of the motor 12.

Figure 3:
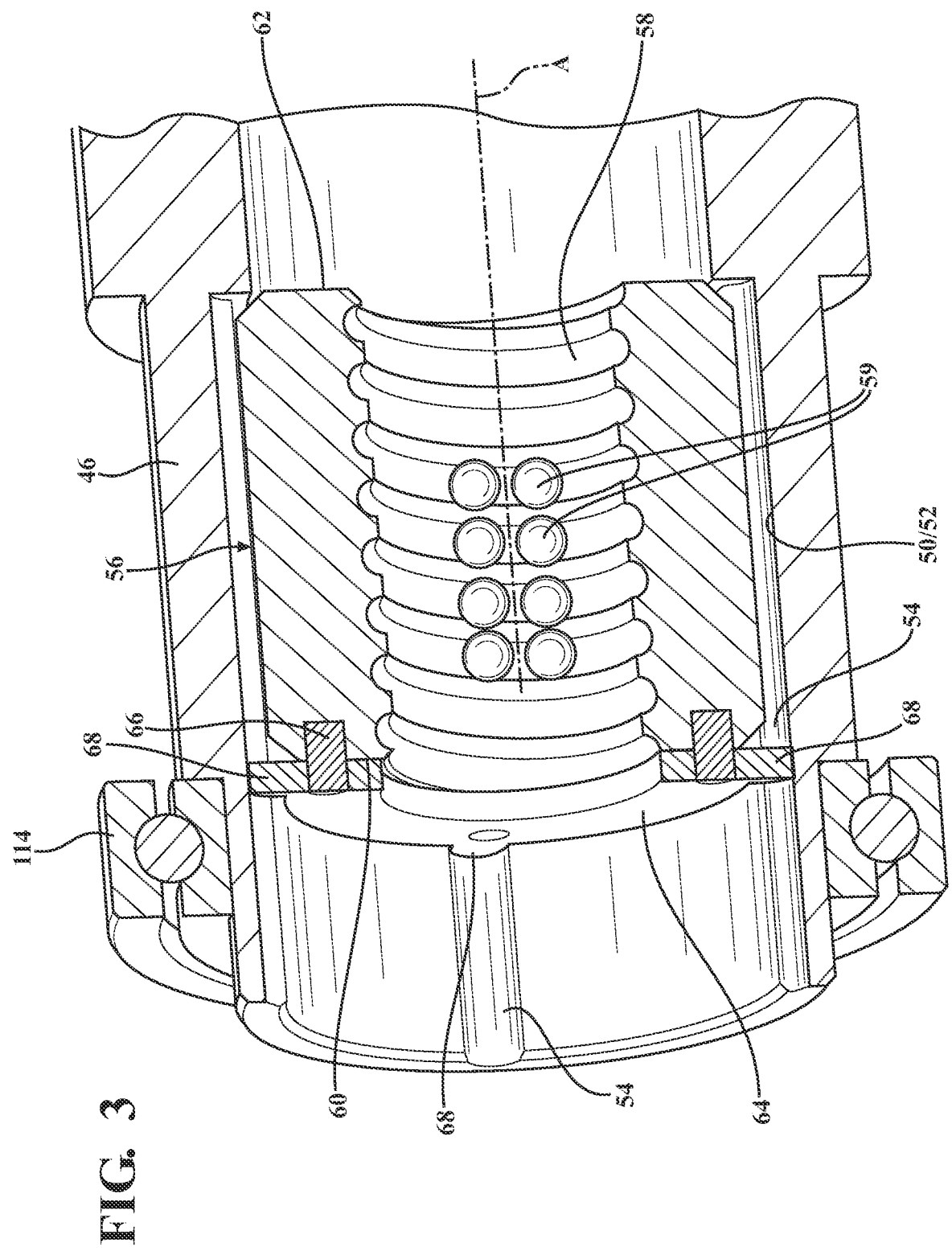
FIG. 3 is a cutaway, perspective view of a rotor and nut of the pressure supply unit.

The rotor 46 presents an inner wall 50 that defines a channel 52 along the axis A. The channel 52 partially receives the piston 16 and receives the spindle 14. As best shown in FIG. 3, the inner wall 50 of the rotor 46 further defines a plurality of grooves 54 that extend axially and are arranged in circumferentially spaced relationship with one another.

A nut 56 is fixed to the inner wall 50 of the rotor 46 and is configured to convert rotational movement of the rotor 46 into axial translation of the spindle 14. More particularly, the nut 56 presents a threaded inner surface 58 that is threadedly connected to the threaded outer surface 40 of the spindle 14 for providing axial movement of the spindle 14 in response to rotation of the rotor 46 and nut 56. The threaded connection between the nut 56 and spindle 14 may include a plurality of ball bearings 59 for facilitating rotation between the components. A conventional threaded connection comprised exclusively inner threads and outer threads may also be employed. The nut 56 extends axially between a first nut end 60 and a second nut end 62. A retainer plate 64 is fixed axially against the first nut end 60. A plurality of fasteners 66, such as bolts or the like, axially and rotationally fix the retainer plate 64 to the first nut end 60. The retainer plate 64 presents a plurality of guides 68 that extend radially outwardly from an outer circumference of the retainer plate 64. Each of the guides 68 are received by one of the grooves 54 of the rotor 48 to permit axially movement of the retainer plate 64 and nut 56 relative to the rotor 46 during assembly while inhibiting rotational movement of the retainer plate 64 and nut 56 relative to the rotor 46.

As best shown in FIG. 4, an anti-rotation sleeve 70 is disposed about the spindle 14 and fixed to the booster body 20. The anti-rotation sleeve 70 is configured to inhibit rotation of the spindle 14 while permitting axial movement of the spindle 14. The anti-rotation sleeve 70 extends axially between a proximal end 72 axially engaging the motor cover 24 and a distal end 74 axially engaging the second nut end 62 of the nut 56. The anti-rotation sleeve 70 defines a radially inside wall 76. The inside wall 76 of the anti-rotation sleeve 70 defines a plurality of grooves 78 that extend axially and spaced circumferentially from one another. A retainer 80 is located about the axis A inside the anti-rotation sleeve 70 and keyed to the rear end 38 of the spindle 14. A generally rectangular-shaped protrusion 82 extends axially at the rear end 38 of the spindle 14. The retainer 80 defines an opening 84 that has substantially the same shape as the protrusion 82, and receives the protrusion 82 to key the retainer 80 to the spindle 14. The retainer 80 presents a plurality of fingers 86 that extend radially outwardly from an outer circumference of the retainer 80, with each finger 86 each received by one of the grooves 78 of the inside wall 76 of the anti-rotation sleeve 70 to inhibit rotational movement of the retainer 80 and spindle 14 while permitting axial movement of the retainer 80 and spindle 14 relative to the anti-rotation sleeve 70. A bolt 88 or the like is threadedly received by the protrusion 82 along the axis A and axially secures the retainer 80 to the spindle 14. As best shown in FIGS. 1 and 2, one or more wave washers 89 or other spring elements are positioned axially between the retainer 80 and the motor cover 24 for accommodating axial movement of the spindle 14 toward the motor cover 24.

As best shown in FIGS. 1 and 5-6A, the motor cover 24 presents an axially extending annular protrusion 90 that defines a pocket 92 inside the compartment 26 of the motor cover 24. The anti-rotation sleeve 70 is rotationally fixed to the motor cover 24 inside the pocket 92. More particularly, the anti-rotation sleeve 70 presents a flange 96 that extends radially outwardly at its proximal end 72. The flange 86 presents at least one first planar surface 98 along a radially outer surface of the flange 86. According to the example embodiment, a pair of first planar surfaces 98 are located on circumferentially opposite sides of the anti-rotation sleeve 70, however any number of first planar surfaces 98 could be employed. As best shown in FIG. 6A, an outer surface of the protrusion 90 is compressed/punched radially inwardly in circumferential alignment with each of the first planar surfaces 98 of the anti-rotation sleeve 70 to define one or more staked portions 99 for axially and rotationally fixing the anti-rotation sleeve 70 to the motor cover 24. The staked portions 99 may include one or more second planar surfaces 101 that overly the planar surfaces 98 to further aid in preventing rotation of the anti-rotation sleeve 70 relative to the motor cover 24.

Figure 7:
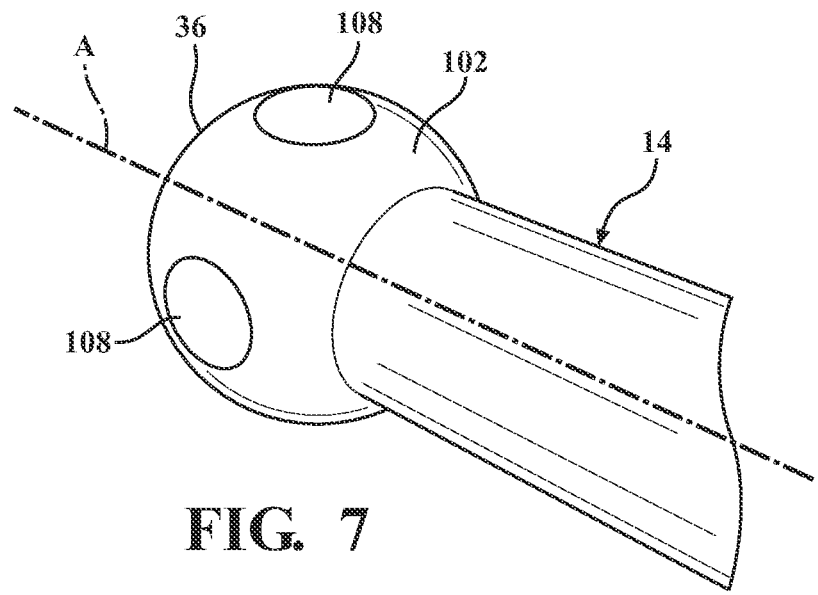
FIG. 7 is a perspective view of a ball of a ball and socket joint located at the end of the spindle, illustrating a plurality of scored segments on the ball.
Figure 8:
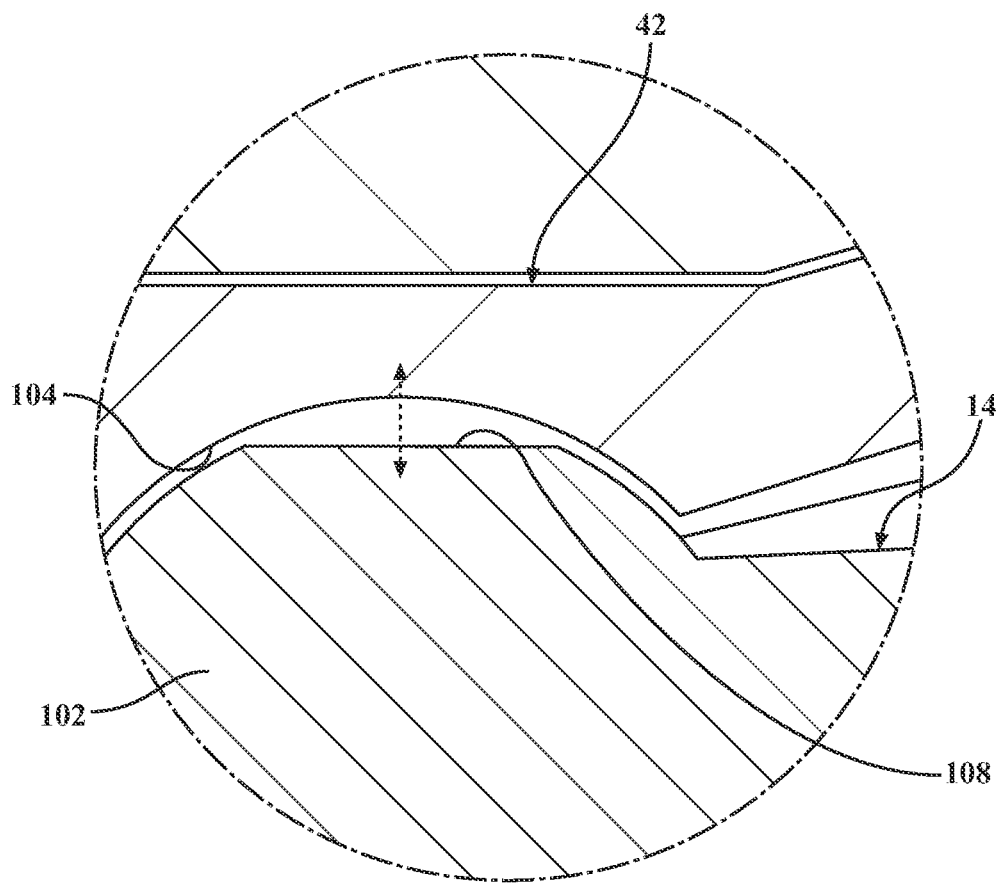
FIG. 8 is a magnified, cutaway view of the ball and socket joint, illustrating the scored segments relative to the socket.

As best shown in FIGS. 1 and 7-8, the ball and socket joint 42 includes a ball 102 at the front end 36 of the spindle 14, and a socket 104 adjacent to the end 30 of the bore 28 of the piston 16. The socket 104 receives the ball 102 to accommodate pivoting movement of the spindle 14 relative to the piston 16. The ball and socket joint 42 includes an insert 106 received in the bore 28 of the piston 16 and fixed to the piston 16 adjacent to the end 30 of the bore 28. The insert 106 defines the socket 104.

As best shown in FIGS. 7-8, the ball 102 defines at least one scored segment 108 for providing lateral movement of the ball 102 relative to the socket 104 while the ball 102 still inhibits pulling the spindle 14 axially free from the socket 104. According to the example embodiment, the ball 102 defines a plurality of the scored segments 108 in spaced relationship with one another. Four scored segments 108 may be equally circumferentially spaced around the ball 102 to provide lateral movement in vertical and horizontal directions. Because of the scored segments 108, the ball and socket joint 42 helps to compensate for any angular misalignment between the piston 16 and spindle 14 to minimize premature wear out of the ball screw by minimizing side loads. The arrangement of the ball and socket joint 42 and piston 16 also eliminates the need for a separate sleeve with an anti-rotation feature, thus significantly reducing cost and assembly complexity. Furthermore, with careful sizing and/or shaping of the ball 102, small clearances can be maintained after insertion. This allows additional degrees of lateral freedom to assure elimination of binding of the spindle 14 at the ball 102. Since the ball 102 is primarily unilaterally loaded by system brake pressure, small amount of travel at the start position of the ball 102 can be easily compensated for.

It should be appreciated that due to the locations and arrangements of the anti-rotation sleeve 70 and ball and socket joint 42, side loads between piston 16 and spindle 14 are virtually non-existent.

Figure 9:
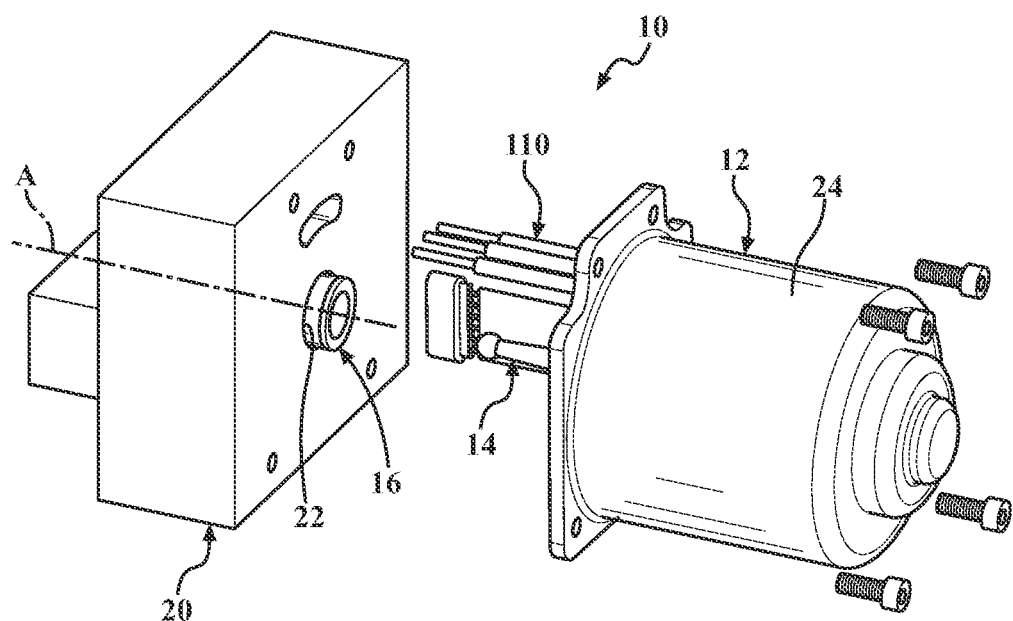
FIG. 9 is a perspective view of the pressure supply unit, illustrating an arrangement in which the piston is installed in the booster body prior to being connected to the spindle with the ball and socket joint.
Figure 10:
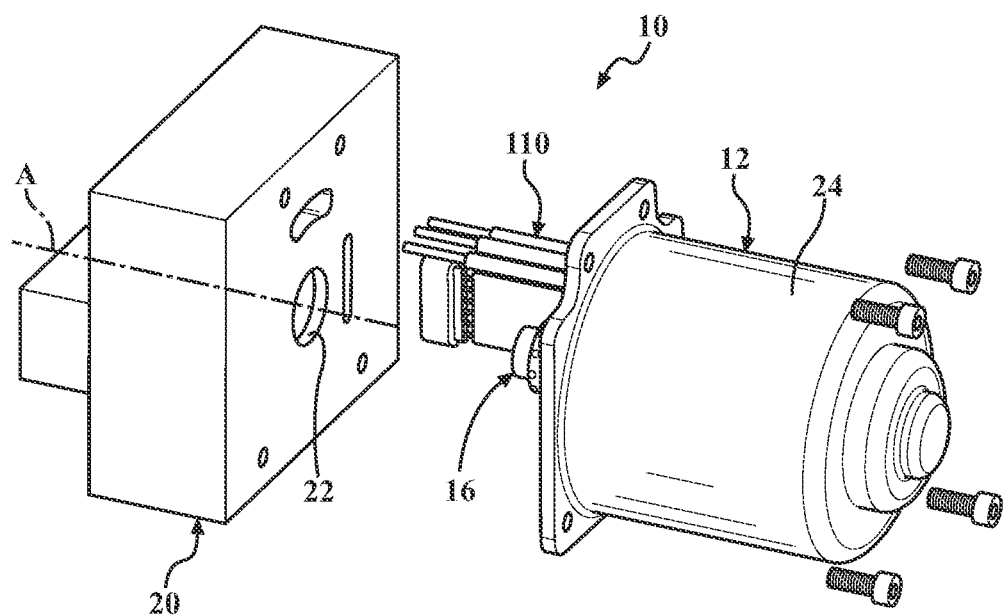
FIG. 10 is a perspective view of the pressure supply unit, illustrating an arrangement in which the piston and spindle are pre-assembled with the ball and socket joint prior to being connected to the booster body.
Figure 11:
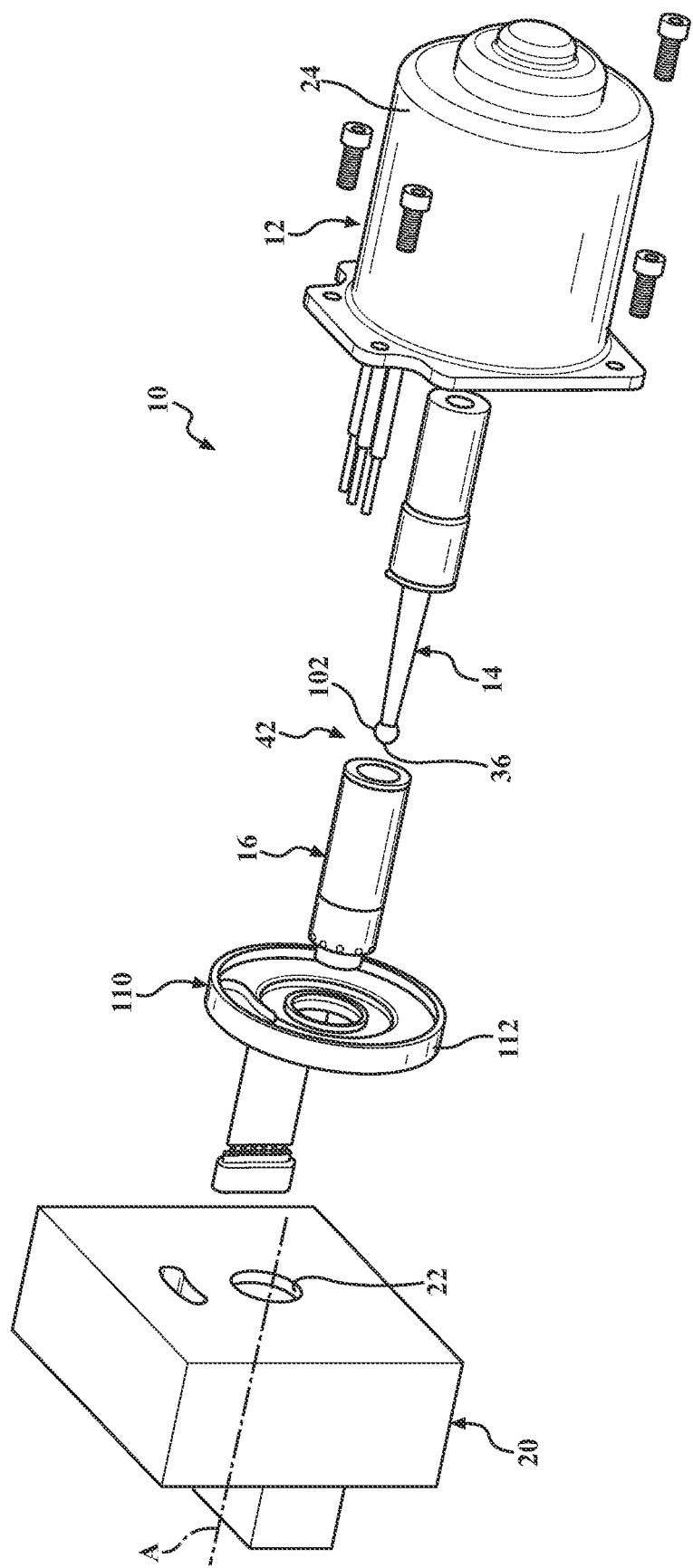
FIG. 11 is a perspective exploded view of the arrangements of FIGS. 9-10.

As set forth in FIGS. 9-10, due to the aforementioned arrangement of the piston 16 and ball and socket joint 42, two different assembly operations may be employed for installing the piston 16 and ball and socket joint 42. More particularly, according to a first operation illustrated in FIG. 9, the piston 16 may first be installed in the booster body 20, and the ball and socket joint 42 may be snapped together after installation of the piston 16. Alternatively, as illustrated in FIG. 10, the ball and socket joint 42 and piston 16 may be assembled in advance, and the piston 16 may subsequently be inserted into the cylinder 22 of the booster body 20. FIG. 11 shows an exploded assembly view of both of these arrangements.

As best shown in FIGS. 1-2, a capacitive rotor angle sensor assembly 110 may be positioned about the rotor 46 and located axially between the stator 44 and the booster body 20. The capacitive rotor angle sensor assembly 116 includes a motor support plate 110 positioned axially against the booster body 20 in the compartment 26 of the motor cover 24 and positioned about the piston 16. At least one sensor bearing 114 is located between the motor support plate 110 and the rotor 46 in order to allow relative rotation between the motor support plate 110 and rotor 46. The capacitive rotor angle sensor assembly 116 includes a plurality of electrical connectors 118 electrically connecting the capacitive rotor angle sensor assembly 116 to the ECU 18 for transmitting rotor angle data 110.

Figure 12:
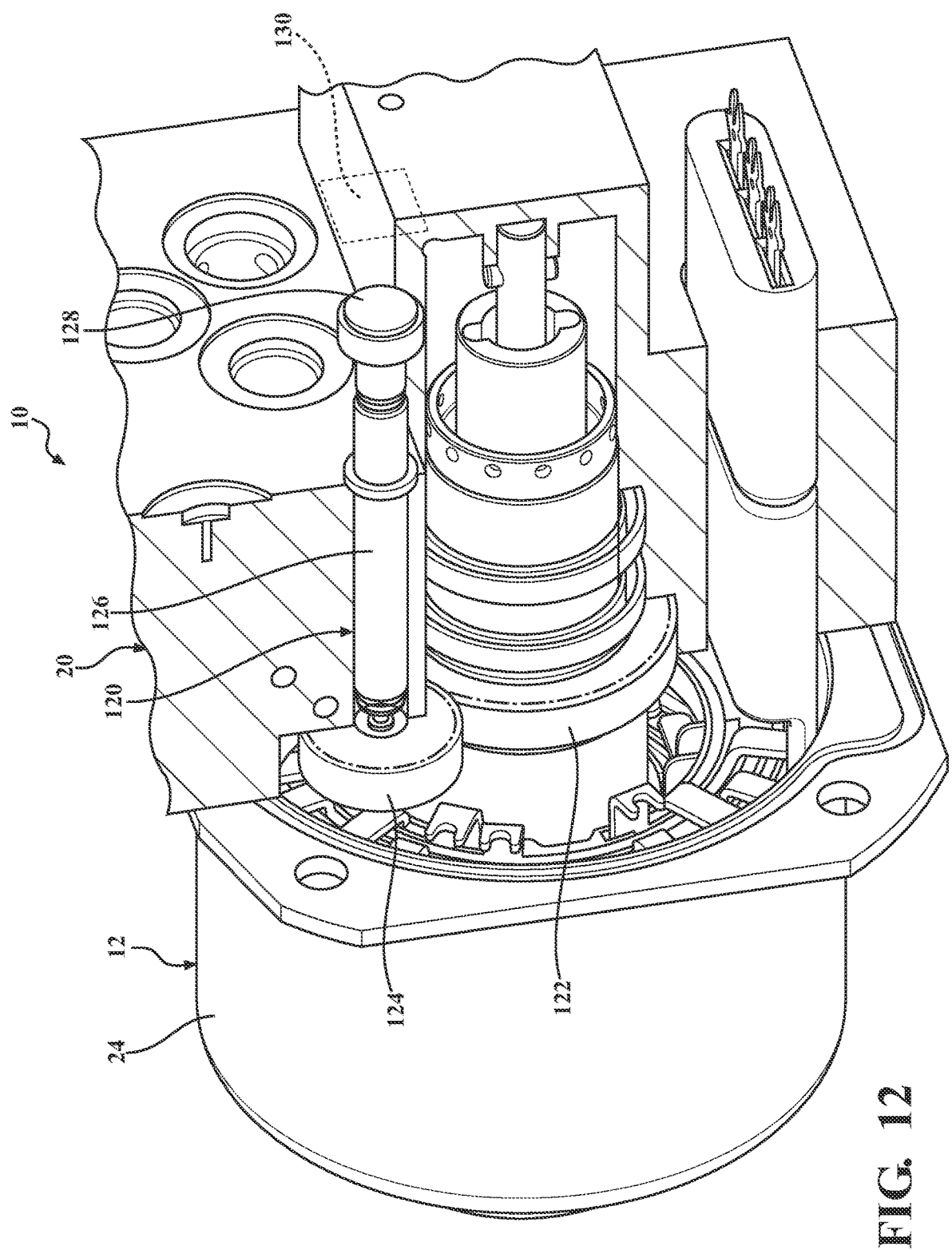
FIG. 12 is a perspective cutaway view of the pressure supply unit, illustrating an alternate arrangement of a rotor angle sensor assembly.
Figure 13:
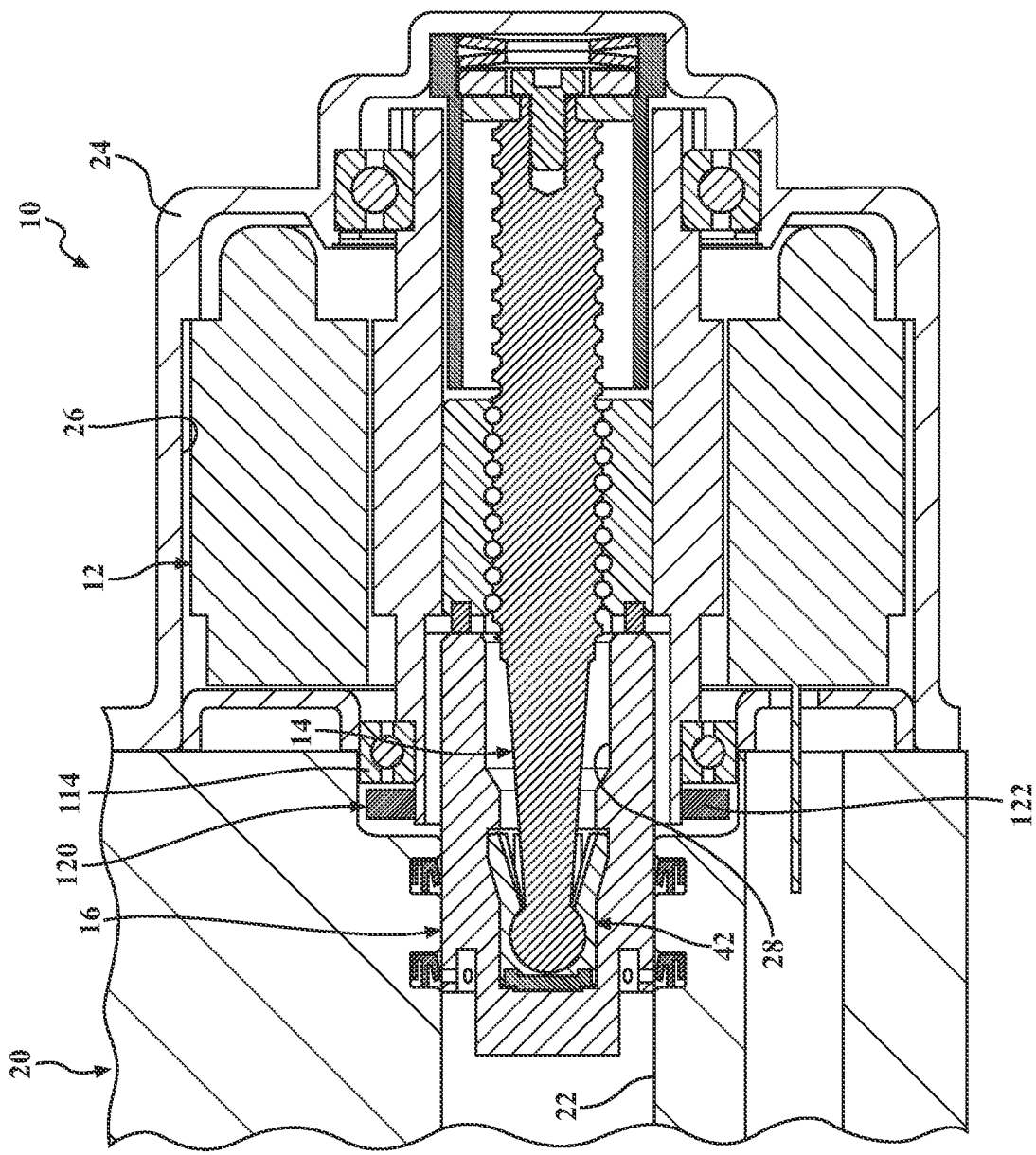
FIG. 13 is a side cutaway view of the pressure supply unit, illustrating the alternate arrangement of the rotor angle sensor assembly.
Figure 14:
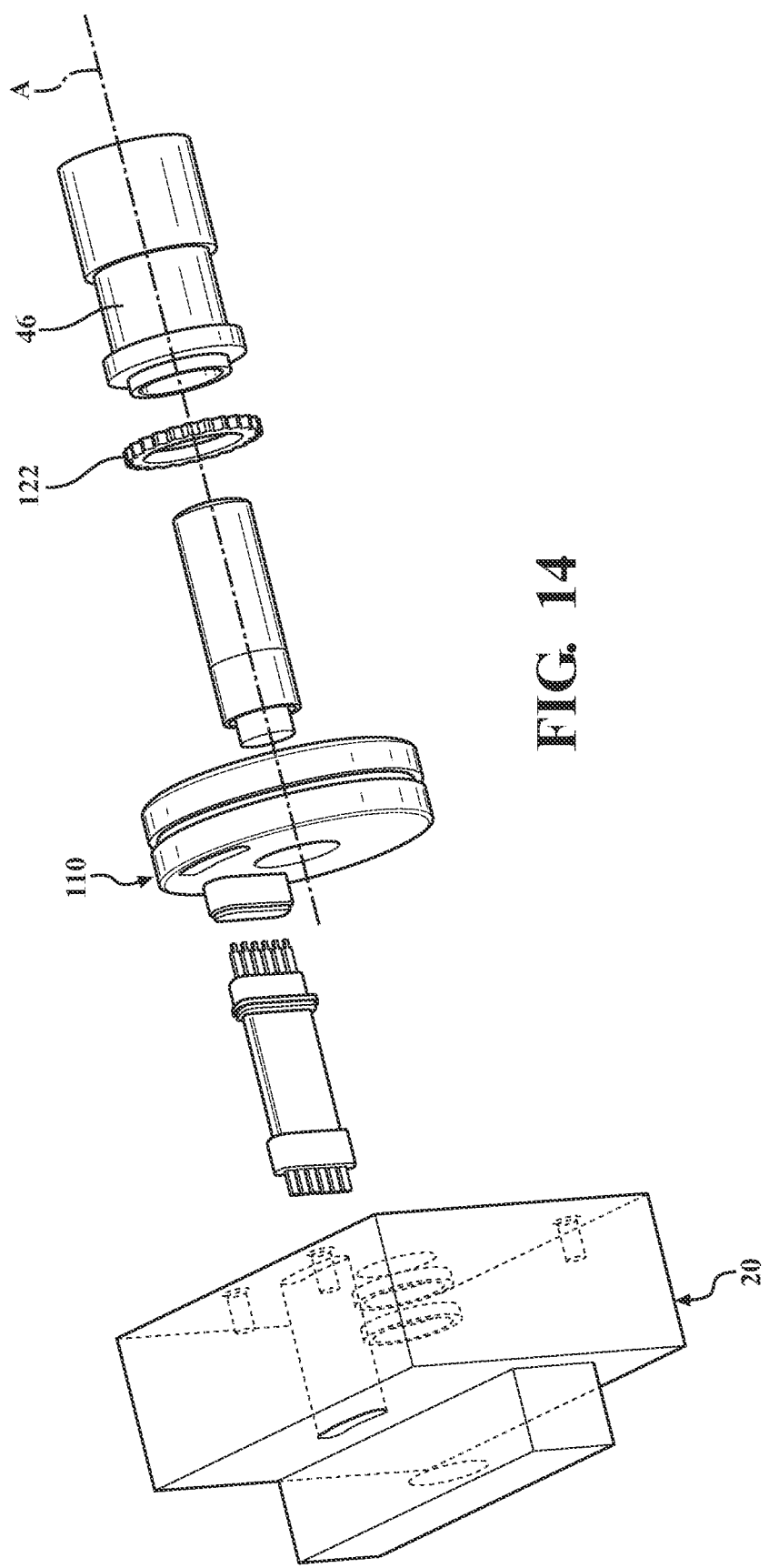
FIG. 14 is a perspective exploded view of the pressure supply unit, illustrating a gear of the alternate arrangement of the rotor angle sensor assembly.

According to an alternate embodiment of a rotor angle sensor assembly 120 best presented in FIG. 12, a first gear 122 is rotatable with the rotor 46. A second gear 124 is meshed with the first gear 122. An axially extending rod 126 is rotatable with the second gear 124 and is connected to a magnet 128. A magnet sensor 130 is configured to detect the magnet 128 for determining rotor angle data and transmitting the rotor angle data to the ECU 18. FIG. 13 illustrates that according to this arrangement, the first gear 122 may have a smaller diameter than the sensor bearing 114. Accordingly, the sensor bearing 114 can be designed with the motor cover 24 as a "half-in/half-out" design and be used to pilot the motor 12 into the booster body 20. FIG. 14 illustrates a connection of a first gear 122 to a rotor 46 according to this embodiment.

Figure 15:
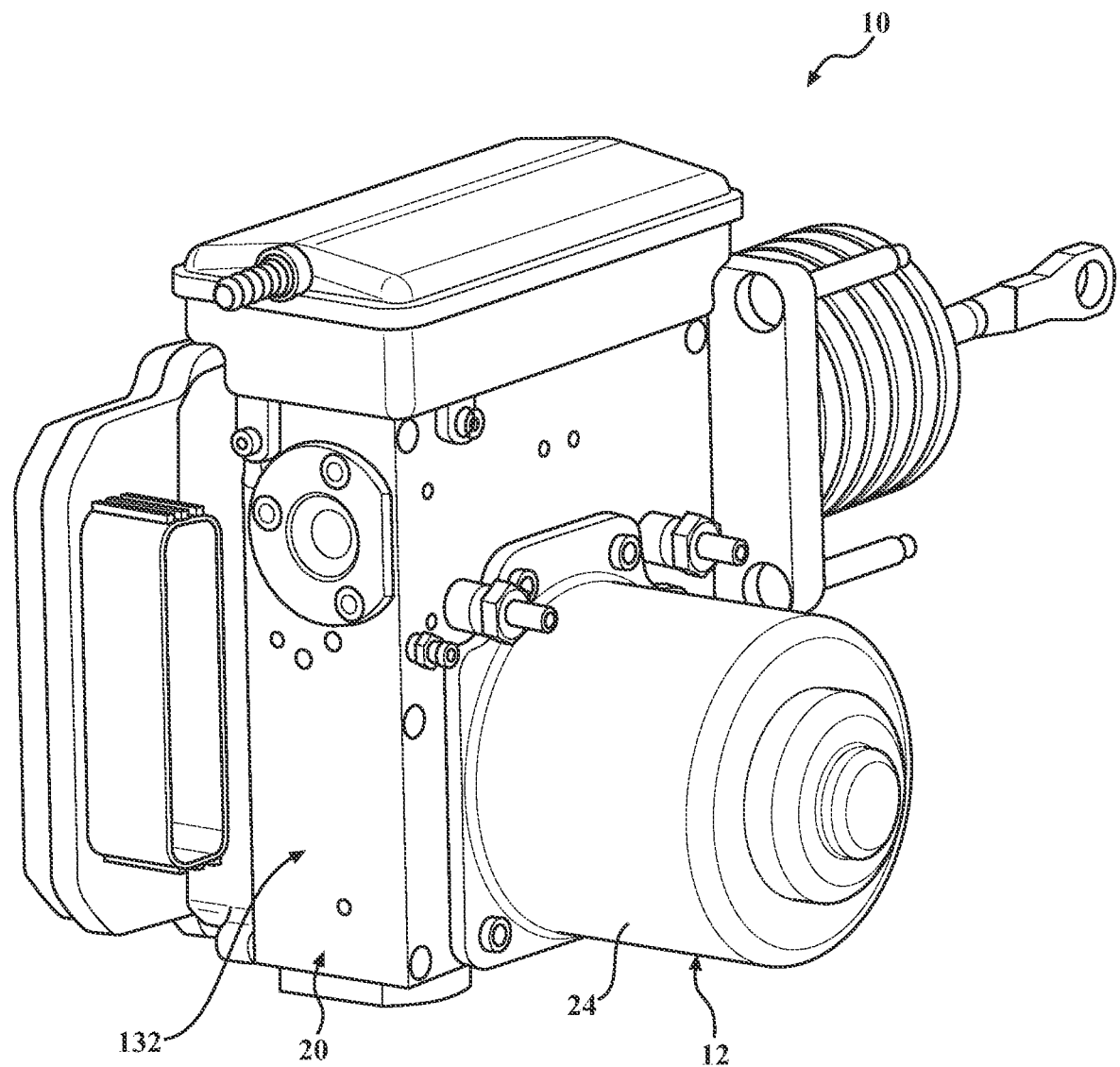
FIG. 15 is a perspective view of an arrangement of the pressure supply unit in which a single master cylinder hydraulic control unit block has an extruded, transverse boss which defines the cylinder.
Figure 16:
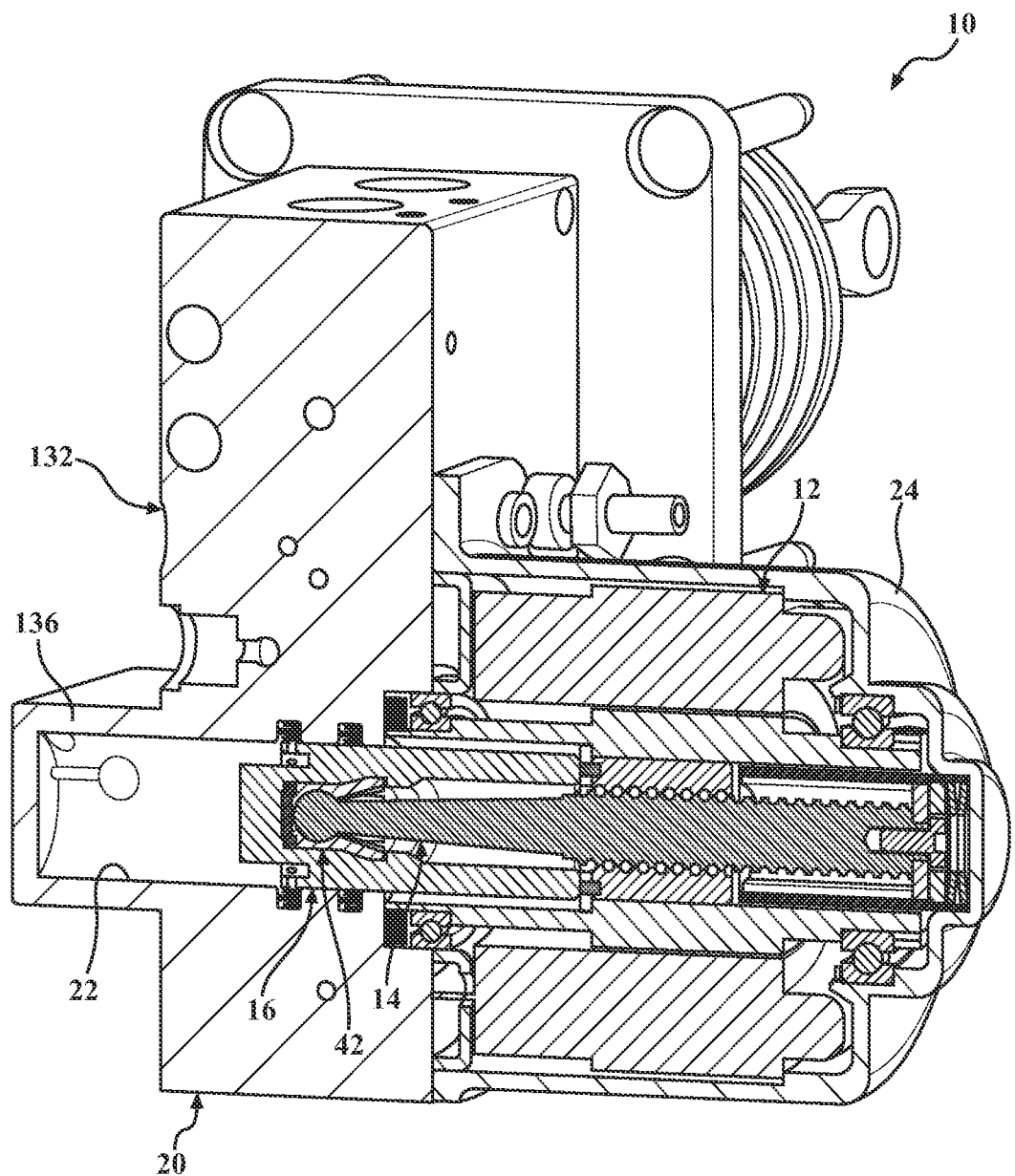
FIG. 16 is a cutaway view of FIG. 15.
Figure 17:
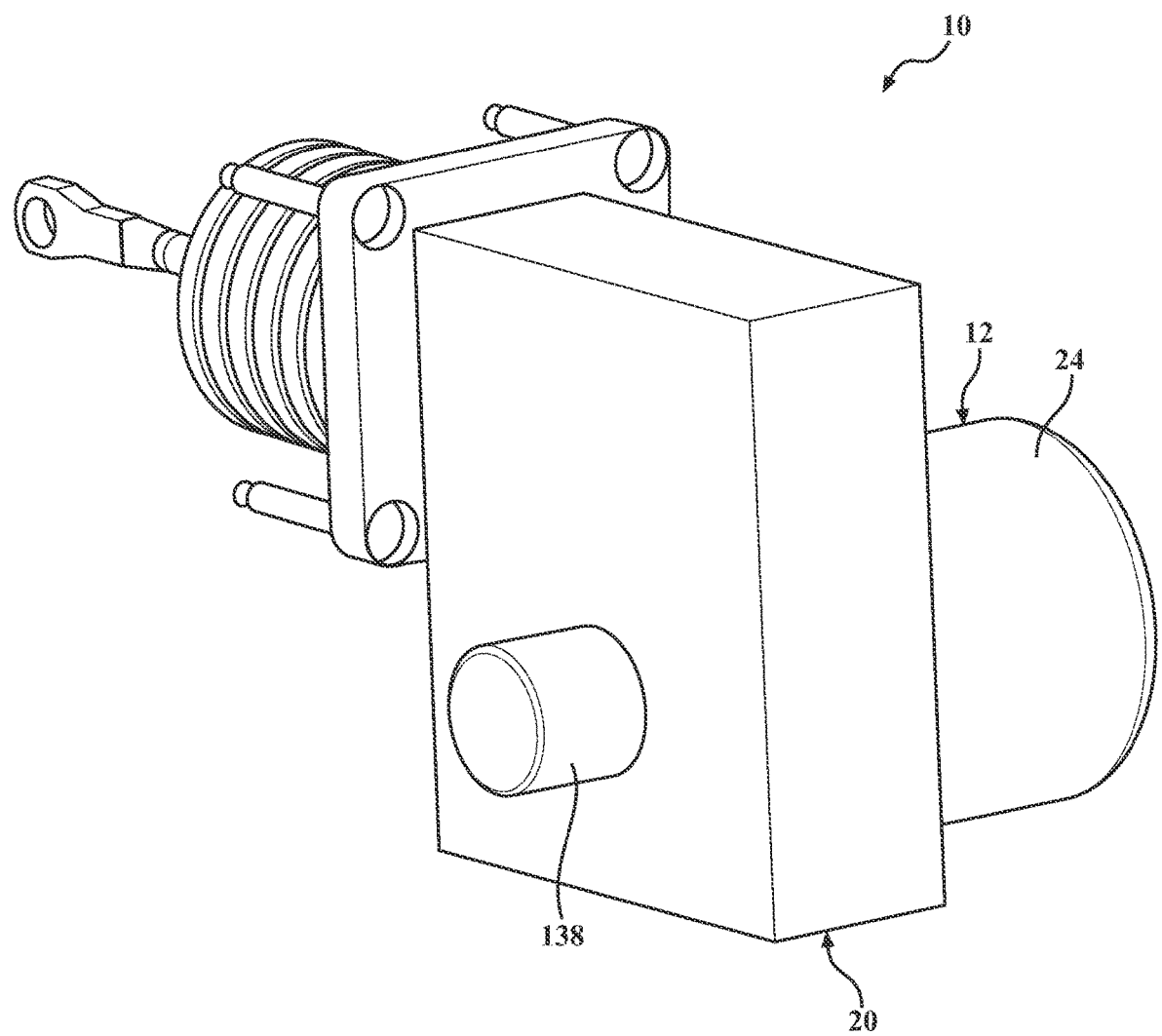
FIG. 17 is a perspective view of an arrangement of the pressure supply unit including a simplified sleeve which defines the cylinder.
Figure 18:
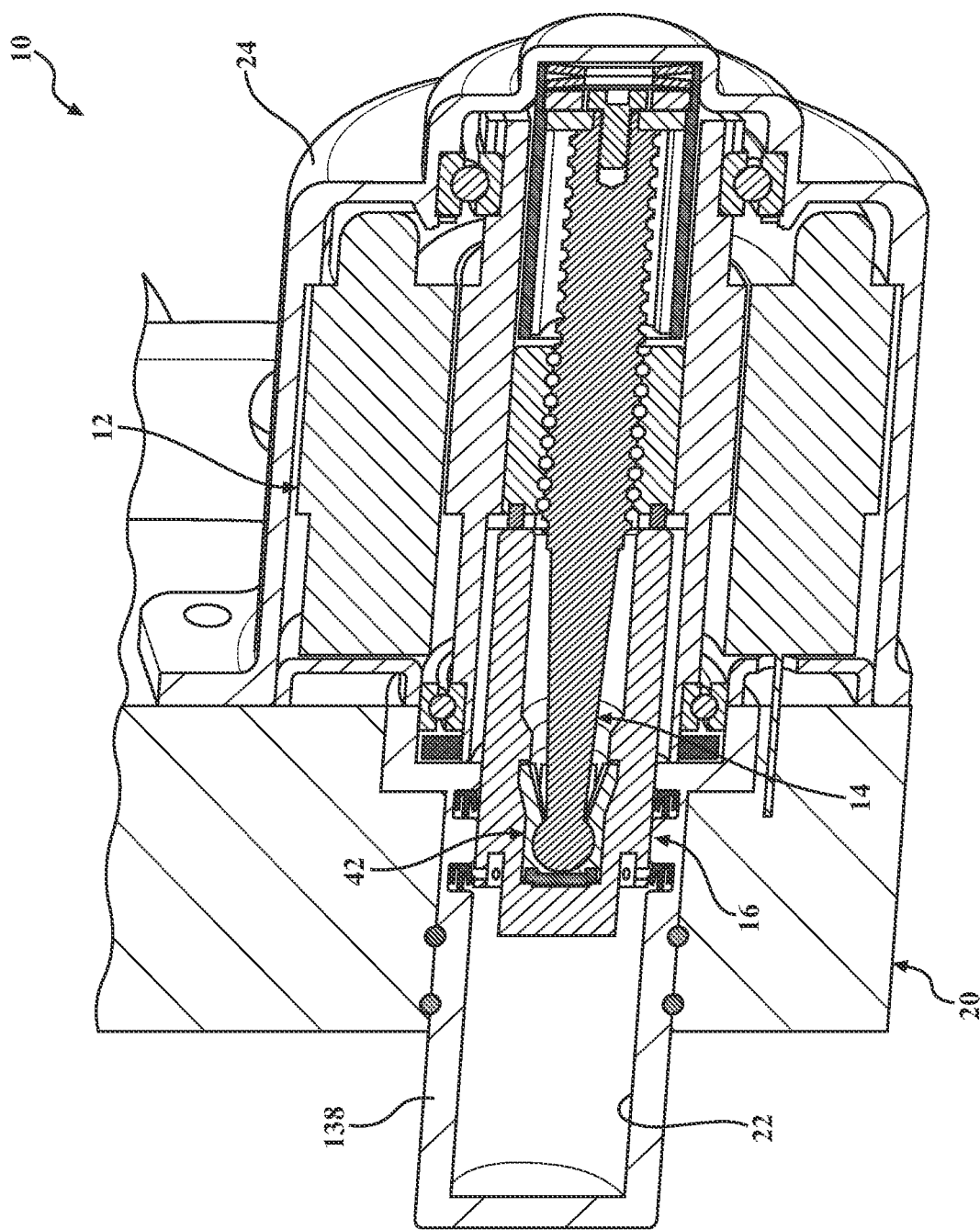
FIG. 18 is a cutaway view of FIG. 17.
Figure 19:
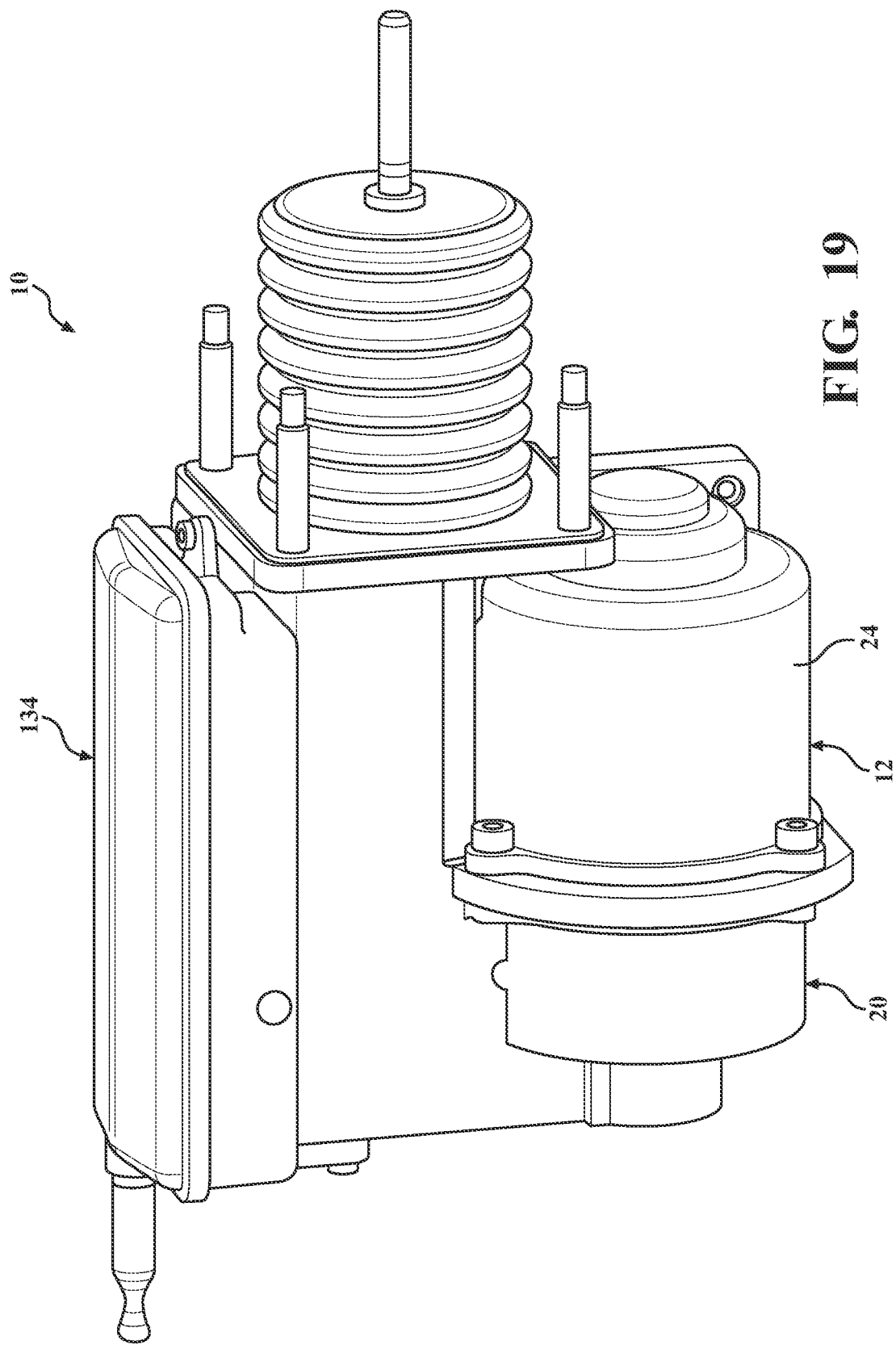
FIG. 19 is a perspective view of an arrangement of the pressure supply unit in which master cylinder block is incorporated with a parallel motor layout.
Figure 20:
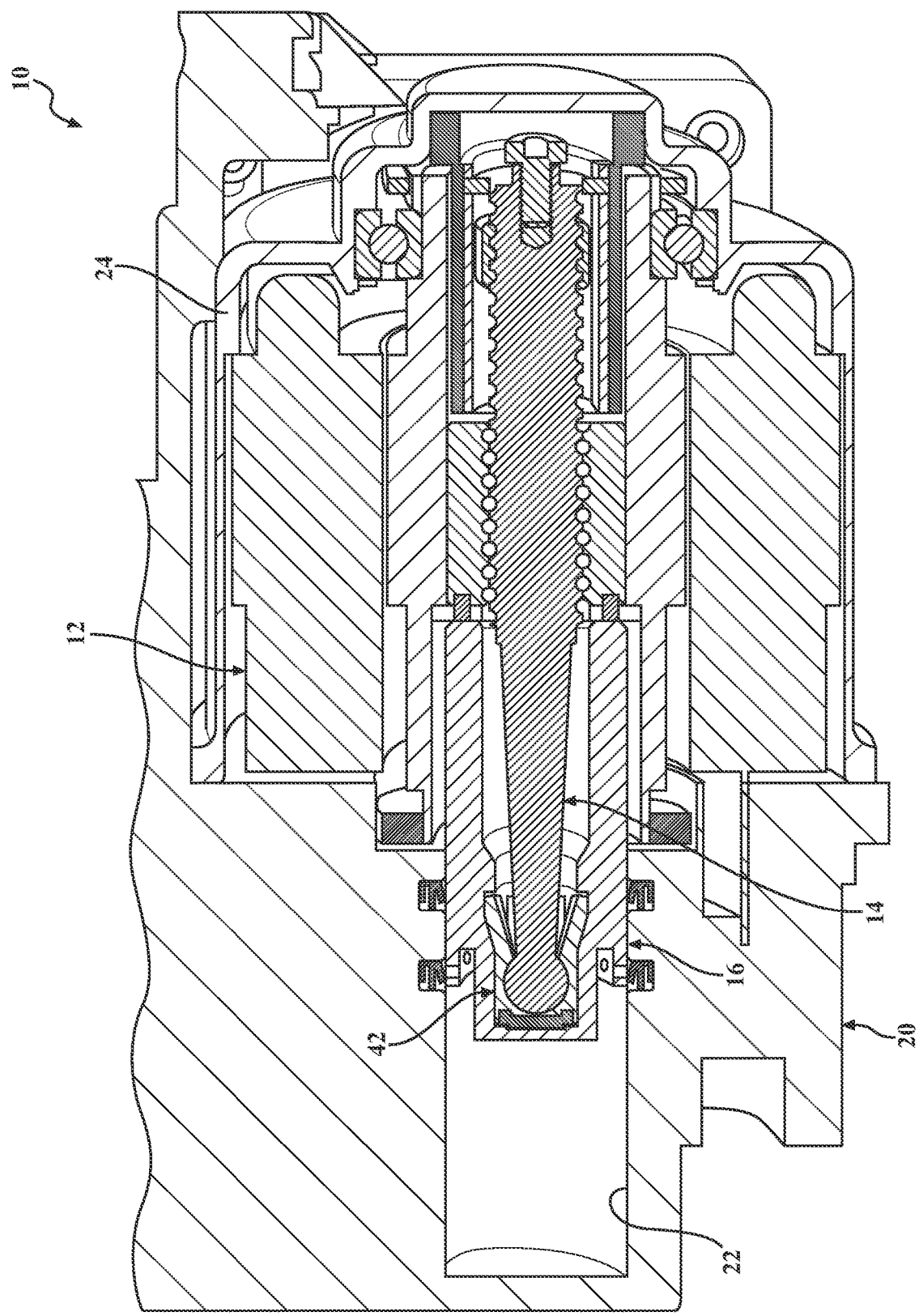
FIG. 20 is a cutaway view of FIG. 19.

As demonstrated by FIGS. 15-20, a design advantage of the subject pressure supply unit 10 is that the motor 12 and piston 16 require no external feature in the cylinder 22 to restrain rotation of the piston 16. Accordingly, even though the overall length of the motor 12 may be relatively long, savings in length of the cylinder 22 can compensate for this. To this point, three different embodiments for packaging the system are shown in FIGS. 15-20. More particularly, FIGS. 15-16 show a first design in which a single master cylinder HCU block (anti-lock brake system controller) 132 has an extruded, transverse boss 136 which defines the cylinder 22. The boss is integrally formed with the booster body 20. Furthermore, FIGS. 17-18 shown a simplified sleeve 138 which defines the cylinder 22 (no rotational constraints necessary) that is coupled with a booster body 20 in which an extruded rectangular master cylinder/HCU block 132 is designed with a transverse motor 12. Furthermore, FIGS. 19-20 show a design in which a machined or cast and machined master cylinder block 134 is incorporated with a parallel motor 12 layout.

It should be appreciated that the simple assembly of the overall design of the subject pressure supply unit 10 provides cost savings advantages, elimination of critical build tolerance, and assembly processes geared to high volume production.

Obviously, many modifications and variations of the present invention are possible in light of the above teachings and may be practiced otherwise than as specifically described while within the scope of the appended claims. Notably, features of the embodiments described herein may be used in conjunction with one another in various combinations.

What is claimed is:

1. A pressure supply unit for a brake system, comprising:
   a booster body defining a cylinder extending along an axis;
   a piston axially slideable within the cylinder;
   the piston defining a bore along the axis;
   a spindle extending along the axis and received by the bore of the piston and rotationally fixed and axially moveable for providing the axial movement of the piston;
   a motor positioned about the spindle and configured to axially translate the spindle for providing the axial movement of the piston;
   a ball and socket joint coupling the spindle to the piston, the ball and socket joint including a ball at a front end of the spindle and a socket in the bore of the piston and receiving the ball to accommodate pivoting movement of the spindle relative to the piston;
   the motor including a rotor being rotatable and located about the spindle and defining an inner wall; and
   a nut fixed to the inner wall of the rotor, the nut presenting a threaded inner surface threadedly connected to a threaded outer surface of the spindle for providing the axial movement of the spindle in response to rotation of the rotor and the nut;
   wherein the inner wall of the rotor defines a plurality of grooves extending axially and circumferentially spaced from one another, wherein a retainer plate is fixed axially against an end of the nut, and wherein the retainer plate presents a plurality of guides extending radially outwardly from an outer circumference of the retainer plate and each received by one of the grooves of the rotor to permit axially movement of the retainer plate and nut relative to the rotor during assembly while inhibiting rotational movement of the retainer plate and nut relative to the rotor.

2. The pressure supply unit as set forth in claim 1, wherein the ball defines at least one scored segment for providing lateral movement of the ball relative to the socket while allowing the ball to inhibit axial movement of the ball outside of the socket.

3. The pressure supply unit as set forth in claim 2, wherein the ball defines a plurality of scored segments in spaced relationship with one another.

4. The pressure supply unit as set forth in claim 1, wherein the bore of the piston terminates at an end, and wherein the socket is located adjacent to the end of the bore.

5. The pressure supply unit as set forth in claim 4, wherein an insert is received in the bore of the piston and fixed to the piston adjacent to the end of the bore, and wherein the insert defines the socket.

6. The pressure supply unit as set forth in claim 1, wherein a plurality of fasteners axially and rotationally fix the retainer plate to a first end of the nut.

7. The pressure supply unit as set forth in claim 1, wherein at least one gear is rotatable with the rotor and configured to rotate a magnet, and wherein a sensor detects rotation of the magnet to determine a rotor angle.

8. The pressure supply unit as set forth in claim 7, wherein the at least one gear includes a first gear connected to the rotor, and a second gear meshed with the first gear, and wherein a shaft is connected with the second gear, and wherein the magnet is coupled with an end of the shaft located opposite the second gear.

9. A pressure supply unit for a brake system, comprising:
   a booster body defining a cylinder extending along an axis;
   a piston axially slideable within the cylinder;
   the piston defining a bore along the axis;
   a spindle extending along the axis and received by the bore of the piston and rotationally fixed and axially moveable for providing the axial movement of the piston;
   a motor cover defining a compartment;
   a motor positioned in the compartment of the motor cover and about the spindle and configured to axially translate the spindle for providing the axial movement of the piston;
   the motor including an annular stator and an annular rotor rotatable within the stator in response to a current passing into the stator;
   at least one gear rotatable in response to rotation of the rotor and configured to rotate a magnet, and a sensor for detecting rotation of the magnet to determine a rotor angle of the rotor; and
   an anti-rotation sleeve disposed about the spindle and fixed to the motor cover and configured to inhibit rotation of the spindle while permitting axial movement of the spindle;
   wherein the motor cover is coupled to the booster body and defines a compartment, wherein the motor and anti-rotation sleeve are located in the compartment, and wherein the motor cover presents an axially extending annular protrusion defining a pocket in the compartment inside the motor cover, and wherein the anti-rotation sleeve is rotationally fixed to the motor cover inside the pocket;
   wherein the anti-rotation sleeve presents at least one planar surface along a radially outer surface of the anti-rotation sleeve, and wherein the motor cover defines a staked portion radially engaging the at least one planar surface to rotationally fix the anti-rotation sleeve relative to the motor cover.

10. The pressure supply unit as set forth in claim 9, wherein the at least one gear includes a first gear positioned about and rotatable with the rotor, and a second gear meshed with the first gear and configured to rotate the magnet.

11. The pressure supply unit as set forth in claim 10, wherein a shaft is connected with the second gear, and wherein the magnet is coupled with an end of the shaft located opposite the second gear.

12. A pressure supply unit for a brake system, comprising:
a booster body defining a cylinder extending along an axis;
a motor cover coupled to the booster body and defining a compartment;
a piston axially slideable within the cylinder;
the piston defining a bore along the axis;
a spindle extending along the axis and received by the bore of the piston and rotationally fixed and axially moveable for providing the axial movement of the piston;
a motor positioned about the spindle in the compartment of the motor cover and configured to axially translate the spindle for providing the axial movement of the piston;
the motor including an annular stator and an annular rotor rotatable within the stator in response to a current passing into the stator;
an anti-rotation sleeve disposed about the spindle and fixed to the motor cover and inhibiting rotation of the spindle while permitting axial movement of the spindle; and
the motor cover presenting an axially extending annular protrusion defining a pocket inside the compartment inside the motor cover, and the anti-rotation sleeve rotationally fixed to the motor cover inside the pocket;
wherein the anti-rotation sleeve presents at least one planar surface along a radially outer surface of the anti-rotation sleeve, and wherein the motor cover defines at least one staked portion engaging the at least one planar surface for rotationally fixing the anti-rotation sleeve to the motor cover.

13. The pressure supply unit as set forth in claim 12, wherein the at least one planar surface of the anti-rotation sleeve is a pair of planar surfaces positioned on circumferentially opposite sides of the pocket, and wherein the at least one staked portion includes a pair of staked portions each engaging one of the planar surfaces.

14. The pressure supply unit as set forth in claim 12, wherein the at least one staked portion of the motor cover defines an inner planar surface aligned with the at least one planar surface of the anti-rotation sleeve for further preventing rotation of the anti-rotation sleeve relative to the motor cover.

\* \* \* \* \*